United States Patent
Leppanen et al.

(10) Patent No.: US 10,970,932 B2
(45) Date of Patent: Apr. 6, 2021

(54) PROVISION OF VIRTUAL REALITY CONTENT

(71) Applicant: Nokia Technologies Oy, Espoo (FI)

(72) Inventors: Jussi Leppanen, Tampere (FI); Arto Lehtiniemi, Lempaala (FI); Antti Eronen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/019,872

(22) Filed: Jun. 27, 2018

(65) Prior Publication Data
US 2019/0005728 A1    Jan. 3, 2019

(30) Foreign Application Priority Data
Jun. 28, 2017   (EP) .................................. 17178245

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 16/24578* (2019.01);
(Continued)

(58) Field of Classification Search
CPC ..... G06T 19/006; G06T 19/20; G06T 15/005; G06T 2215/16; G06F 16/24578;
(Continued)

(56) References Cited

U.S. PATENT DOCUMENTS

| 2003/0032484 A1 | 2/2003 | Ohshima et al. |
| 2003/0144045 A1* | 7/2003 | Fujita .................... A63F 13/005 463/1 |

(Continued)

FOREIGN PATENT DOCUMENTS

| EP | 3037917 A1 | 6/2016 |
| JP | 2014-203429 A | 10/2014 |

OTHER PUBLICATIONS

Lang, Ben; "Sony's 'Joshua Bell VR Experience' on FSVR is Among the Best VR Video You'll Find on Any Headset"; Feb. 16, 2017; whole document (3 pages); retrieved from the Internet: http://www.roadtovr.com/now-psvr-sonys-joshua-bell-vr-experience-among-best-vr-video-youll-find-headset/.

(Continued)

*Primary Examiner* — Ke Xiao
*Assistant Examiner* — Kim Thanh T Tran
(74) *Attorney, Agent, or Firm* — Harrington & Smith

(57) ABSTRACT

A method is disclosed, including providing data indicative of dimensions of a real-world space within which a virtual world is to be consumed. The method may also include identifying one or more objects within said real-world space, and determining one or more available areas within the real-world space for rendering three-dimensional virtual content, based at least partly on the dimensions of the real-world space. The method may also include identifying one or more of the objects as being movable, identifying, from a set of three-dimensional virtual content items, one or more candidate items unable to be rendered within the available area(s) and which can be rendered if one or more of the movable objects is moved and providing an indication to a virtual reality user device of the candidate virtual item(s) and of the movable object(s) required to be moved.

17 Claims, 15 Drawing Sheets

(51) Int. Cl.
*G06K 9/00* (2006.01)
*G06F 16/2457* (2019.01)
*G06T 15/00* (2011.01)
*G06T 19/20* (2011.01)

(52) U.S. Cl.
CPC ........ *G06K 9/00671* (2013.01); *G06T 15/005* (2013.01); *G06T 19/20* (2013.01); *A63F 2300/69* (2013.01); *A63F 2300/8082* (2013.01); *G06T 2215/16* (2013.01)

(58) Field of Classification Search
CPC . G06F 17/3053; G06F 3/011; G06K 9/00671; G06K 9/00; A63F 2300/8082; A63F 2300/69
USPC ............................................................ 345/633
See application file for complete search history.

(56) References Cited

U.S. PATENT DOCUMENTS

| | | | |
|---|---|---|---|
| 2007/0035561 A1* | 2/2007 | Bachelder | G06T 19/003 345/633 |
| 2011/0310219 A1* | 12/2011 | Kim | G08B 13/19643 348/36 |
| 2012/0075343 A1* | 3/2012 | Chen | G09G 5/397 345/633 |
| 2012/0264510 A1 | 10/2012 | Wigdor et al. | |
| 2013/0141419 A1 | 6/2013 | Mount et al. | |
| 2013/0147799 A1* | 6/2013 | Hoguet | G06Q 10/06 345/420 |
| 2013/0196772 A1 | 8/2013 | Latta et al. | |
| 2013/0328927 A1 | 12/2013 | Mount et al. | |
| 2013/0328928 A1 | 12/2013 | Yamagishi et al. | |
| 2014/0125668 A1* | 5/2014 | Steed | G06T 15/50 345/426 |
| 2014/0128161 A1 | 5/2014 | Latta et al. | |
| 2014/0285522 A1* | 9/2014 | Kim | G06T 19/006 345/633 |
| 2014/0306993 A1* | 10/2014 | Poulos | G06T 19/006 345/633 |
| 2015/0187108 A1 | 7/2015 | Mullins | |
| 2015/0221132 A1* | 8/2015 | Kruglick | G06T 19/006 345/633 |
| 2015/0243079 A1* | 8/2015 | Cho | G02B 27/017 345/633 |
| 2016/0041391 A1 | 2/2016 | Van Curen et al. | |
| 2016/0350973 A1 | 12/2016 | Shapira et al. | |
| 2017/0148339 A1 | 5/2017 | Van Curen et al. | |

OTHER PUBLICATIONS

Sra, M. et al.; "Bringing real objects, spaces, actions, and interactions into social VR"; 2016 IEEE Third VR International Workshop on Collaborative Virtual Environments (3DCVE); Mar. 2016; whole document (2 pages).

Rebrickable Build Search; retrieved from the Internet Jun. 2017;. https://rebrickable.com/build/?color=1&ignore_print=1&ignore_mold=1&ignore_minifigs=1&ignore_non_lego=1&theme=&min_parts=50&max_parts=5000&min_year=1990&max_year=2017&inc_official=1&inc_bmoders=1&inc_custom=1&inc_premium=1&sort_by=1&set_1=41135-1&set_2=3315-1&set_3=41026-1.

* cited by examiner

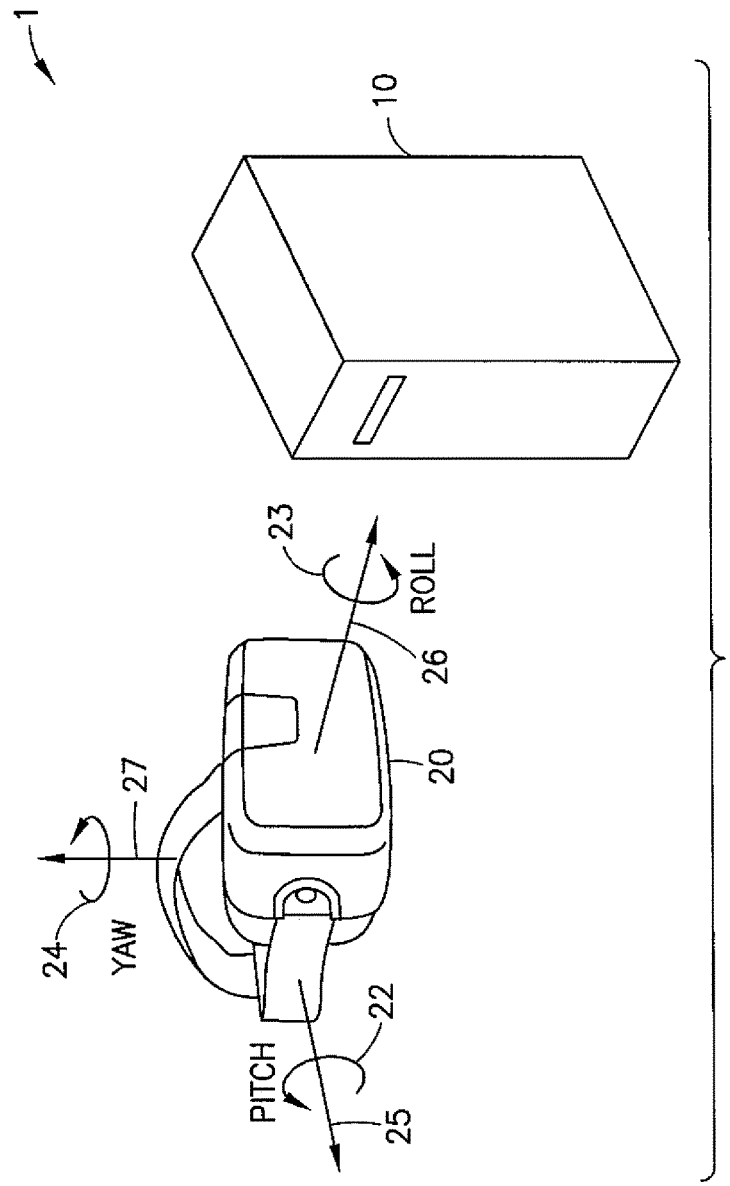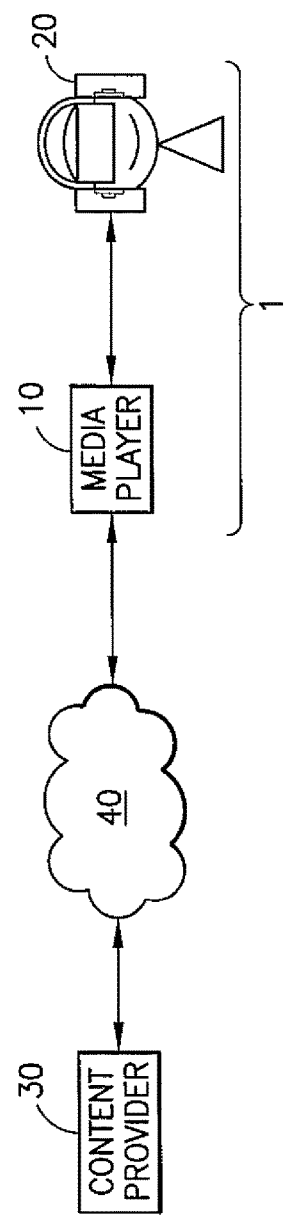

PROVISION OF VIRTUAL REALITY CONTENT

FIELD OF THE INVENTION

This invention relates to virtual reality, particularly the provision of virtual reality content for display at a user display system, e.g. a virtual reality headset.

BACKGROUND OF THE INVENTION

Virtual reality (VR) is a rapidly developing area of technology in which video content is provided to a VR display system. As is known, a VR display system may be provided with a live or stored feed from a video content source, the feed representing a VR space or world for immersive output through the display system. In some embodiments, audio is provided, which may be spatial audio. A virtual space or virtual world is any computer-generated version of a space, for example a captured real world space, in which a user can be immersed through a display system such as a VR headset. A VR headset may be configured to provide VR video and audio content to the user, e.g. through the use of a pair of video screens and headphones incorporated within the headset.

Position and/or movement of the user device can enhance the immersive experience. Currently, most VR headsets use so-called three degrees of freedom (3DoF) which means that the head movement in the yaw, pitch and roll axes are measured and determine what the user sees. This facilitates the scene remaining largely static in a single location as the user rotates their head. A next stage may be referred to as 3DoF+ which may facilitate limited translational movement in Euclidean space in the range of, e.g. tens of centimetres, around a location. A yet further stage is a six degrees of freedom (6DoF) VR system, where the user is able to freely move in the Euclidean space and rotate their head in the yaw, pitch and roll axes. 6DoF VR systems and methods will enable the provision and consumption of volumetric VR content.

Volumetric VR content comprises data representing spaces and/or objects in three-dimensions from all angles, enabling the user to move fully around the spaces and/or objects to view them from any angle. For example, a person or object may be fully scanned and reproduced within a real-world space. When rendered to a VR headset, the user may 'walk around' the person or object and view them from the front, the sides and from behind.

For the avoidance of doubt, references to VR are also intended to cover related technologies such as augmented reality (AR).

SUMMARY OF THE INVENTION

A first aspect of the invention provides a method comprising: providing data indicative of dimensions of a real-world space within which a virtual world is to be consumed; identifying one or more objects within said real-world space; determining one or more available areas within the real-world space for rendering three-dimensional virtual content, based at least partly on the dimensions of the real-world space; identifying one or more of the objects as being movable; identifying, from a set of three-dimensional virtual content items, one or more candidate items unable to be rendered within the available area(s) and which can be rendered if one or more of the movable objects is moved; and providing an indication to a virtual reality user device of the candidate virtual item(s) and of the movable object(s) required to be moved.

Identifying the one or more movable objects may comprise assigning a mobility score to each object indicative of whether or not it is movable. An object may be identified as movable if its mobility score is above a predetermined threshold.

The mobility score may be based on characteristics of the objects and/or their respective position(s) within the real-world space.

Identifying the mobility score may be based on identifying a change in one or more objects' position over time.

The one or more objects may be tracked over time using video data received from one or more cameras within the real-world space.

The one or more objects may be tracked over time using data received from a positioning tag carried by the or each object.

The mobility score may be based on one or more of: the size and/or weight of the object; identifying and classifying a real-world object against a set of real-world objects having pre-assigned mobility scores; and determining whether the same object has previously been identified as movable.

The mobility score may be determined by determining for each identified object a plurality of probability coefficients for the objects based on their respective characteristics and/or positions, the mobility score being an average or aggregate of the probability coefficients.

The probability coefficients may be based on two or more of the object's type, the object's size, the object's movement over time and whether the object has previously been identified as movable.

The method may further comprise receiving a search term from a user, wherein the provided indication of the candidate virtual item(s) is based on the relevance of the item(s) to the search term.

A relevance score may be assigned to the item(s) based on their relevance to the received search term, and wherein the provided indication of the candidate virtual item(s) is given in a ranked order based on the relevance score and the mobility score.

The relevance score and mobility score may be multiplied to provide a ranked subset of candidate virtual item(s).

The method may further comprise identifying one or more characteristics of the real-world space and wherein the identified candidate virtual item(s) are based on said characteristics.

The identified characteristic may be the type of real-world space, e.g. living room, kitchen, hallway, garden etc.

The library of virtual item(s) may be selected based on the type of real-world space.

The identified characteristic may be the brightness of the real-world space.

The identified characteristic may be the temperature of the real-world space.

The method may further comprise determining data indicative of three-dimensions of the real-world space.

The virtual content items may be volumetric virtual worlds and/or volumetric virtual objects.

The method may further comprise providing to the user device an indication of one or more virtual content items that can be rendered within the available area(s) without moving one or more movable objects.

The method may further comprise detecting movement of a movable real-world object and outputting to the user device a selected one of the candidate virtual item(s).

The method may be performed when a user wearing the user device is immersed within a current virtual world.

The method may further comprise receiving position data indicative of a user's position/movement within the current virtual world, and indicating a movable object when the user is proximate said object.

A second aspect of the invention provides a computer program comprising instructions that when executed by a computer control it to perform the method of any preceding definition.

A third aspect of the invention provides an apparatus configured to perform the method of any preceding definition.

A fourth aspect of the invention provides a non-transitory computer-readable medium having stored thereon computer-readable code, which, when executed by at least one processor, causes the at least one processor to perform a method, comprising: providing data indicative of dimensions of a real-world space within which a virtual world is to be consumed; identifying one or more objects within said real-world space;

determining one or more available areas within the real-world space for rendering three-dimensional virtual content, based on the dimensions of the real-world space and the presence of the objects within said real world space; identifying one or more of the objects as being movable; identifying, from a set of three-dimensional virtual content items, one or more candidate items unable to be rendered within the available area(s) and which can be rendered if one or more of the movable objects is moved; and providing an indication to a virtual reality user device of the candidate virtual item(s) and of the movable object(s) required to be moved.

A fifth aspect of the invention provides an apparatus, the apparatus having at least one processor and at least one memory having computer-readable code stored thereon which when executed controls the at least one processor: to provide data indicative of dimensions of a real-world space within which a virtual world is to be consumed; to identify one or more objects within said real-world space; to determine one or more available areas within the real-world space for rendering three-dimensional virtual content, based on the dimensions of the real-world space and the presence of the objects within said real world space; to identify one or more of the objects as being movable; to identify, from a set of three-dimensional virtual content items, one or more candidate items unable to be rendered within the available area(s) and which can be rendered if one or more of the movable objects is moved; and to provide an indication to a virtual reality user device of the candidate virtual item(s) and of the movable object(s) required to be moved.

BRIEF DESCRIPTION OF THE DRAWINGS

The invention will now be described, by way of non-limiting example, with reference to the accompanying drawings, in which:

FIG. 1 is a perspective view of a VR display system, useful for understanding the invention;

FIG. 2 is a block diagram of a computer network including the FIG. 1 VR display system, according to example embodiments of the invention;

DETAILED DESCRIPTION OF PREFERRED EMBODIMENTS

Figure 3:
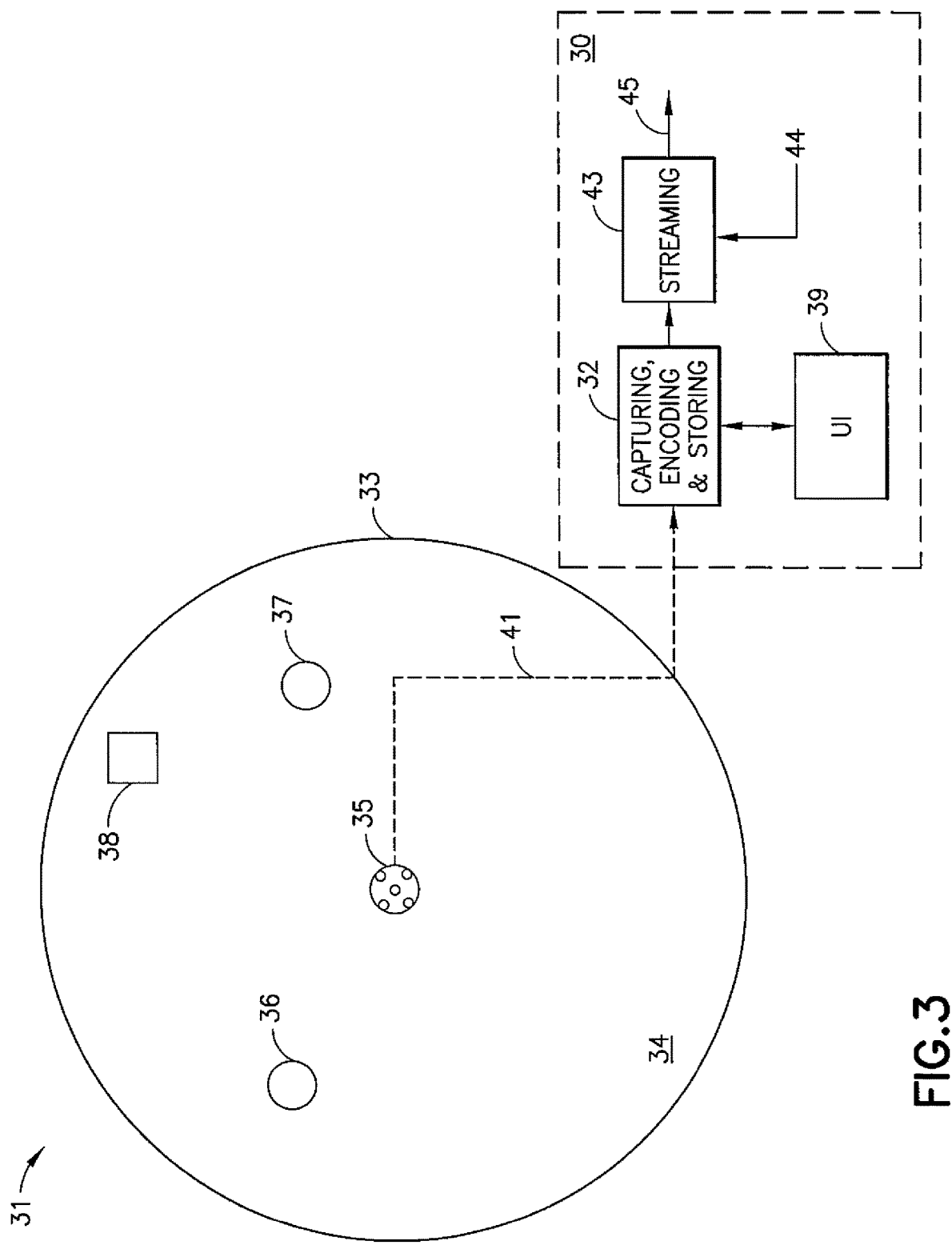
FIG. 3 is a schematic diagram of an example, conventional VR capture scenario, which is useful for understanding background.

Example embodiments herein relate to virtual reality (VR) and in particular to the provision of volumetric 3D spaces or worlds, or indeed any form of VR content, to one or more users using a user device, such as a VR display system. However, the methods and systems described herein are not limited as such, and can be used in any VR application, including augmented reality (AR).

A challenge exists in terms of providing VR spaces or worlds for users located in a real-world space having limited dimensions and/or with one or more objects located in the real-world space. For example, a user may wish to select one or more VR spaces or worlds for consumption in a room at home, at work or at school.

Example embodiments relate to methods and systems for providing a one or more VR worlds or content for display to a VR user device whereby a user can browse and select one or more VR worlds or content for rendering, even when consuming the content within a limited real-world area. For example, the real-world area may be a modest-sized room bounded by walls or other upright surfaces. The real-world area may have one or more real-world objects therein. Problems may exist due to the presence of real-world object(s). For example, the user may be obstructed from experiencing the entire VR world and an object may also present a hazard that may result in injury, e.g. due to tripping.

The VR worlds are represented by VR content data. In some example embodiments, the VR content data may be stored remotely from the one or more users, and streamed to users over a network, e.g. an IP network such as the Internet. In some example embodiments, the VR content data may be stored local to the one or more users on a memory device, such as a hard disk drive (HDD) or removable media such as a CD-ROM, DVD or memory stick. In some example embodiments, the VR content data may be stored on a cloud-based system.

In example embodiments described herein, it is assumed that the VR content data is stored remotely from one or more users, e.g. at a content server, and streamed over an IP network to one or more users. The data stream of VR content data may represent one or more VR spaces or worlds for immersive output through the display system. In some example embodiments, audio may also be provided, which may be spatial audio.

FIG. 1 is a schematic illustration of a VR display system 1 which represents user-end equipment. The VR system 1 includes a user device in the form of a VR headset 20, for displaying visual data for a VR space, and a VR media player 10 for rendering visual data on the VR headset 20. In some example embodiments, a separate user control (not shown) may be associated with the VR display system 1, e.g. a hand-held controller.

In the context of this specification, a virtual space or world is any computer-generated version of a space, for example a captured real world space, in which a user can be immersed. In some example embodiments, the virtual space may be entirely computer-generated, i.e. not captured. The VR headset 20 may be of any suitable type. The VR headset 20 may be configured to provide VR video and audio content data to a user. As such, the user may be immersed in virtual space.

The VR headset 20 receives the VR content data from a VR media player 10. The VR media player 10 may be part of a separate device which is connected to the VR headset 20 by a wired or wireless connection. For example, the VR media player 10 may include a games console, or a PC configured to communicate visual data to the VR headset 20.

Alternatively, the VR media player 10 may form part of the VR headset 20.

Here, the VR media player to may comprise a mobile phone, smartphone or tablet computer configured to play content through its display. For example, the VR media player 10 may be a touchscreen device having a large display over a major surface of the device, through which video content can be displayed. The VR media player 10 may be inserted into a holder of a VR headset 20. With such VR headsets 20, a smart phone or tablet computer may display visual data which is provided to a user's eyes via respective lenses in the VR headset 20. The VR display system 1 may also include hardware configured to convert the device to operate as part of VR display system 1. Alternatively, the VR media player 10 may be integrated into the VR headset 20. The VR media player 10 may be implemented in software. In some example embodiments, a device comprising VR media player software is referred to as the VR media player 10.

The VR display system 1 may include means for determining the spatial position of the user and/or orientation of the user's head. This may be by means of determining the spatial position and/or orientation of the VR headset 20. Over successive time frames, a measure of movement may therefore be calculated and stored. Such means may comprise part of the VR media player 10. Alternatively, the means may comprise part of the VR headset 20. For example, the VR headset 20 may incorporate motion tracking sensors which may include one or more of gyroscopes, accelerometers and structured light systems. These sensors generate position data from which a current visual field-of-view (FOV) is determined and updated as the user, and so the VR headset 20, changes position and/or orientation. The VR headset 20 will typically comprise two digital screens for displaying stereoscopic video images of the virtual world in front of respective eyes of the user, and also two speakers for delivering audio, if provided from the VR media player 10. The example embodiments herein, which primarily relate to the delivery of VR content, are not limited to a particular type of VR headset 20.

In some example embodiments, the VR display system 1 may determine the spatial position and/or orientation of the user's head using the above-mentioned 6DoF method. As shown in FIG. 1, these include measurements of pitch 22, roll 23 and yaw 24 and also translational movement in Euclidean space along side-to-side, front-to-back and up-and-down axes 25, 26, 27.

The VR display system 1 may be configured to display VR content data to the VR headset 20 based on spatial position and/or the orientation of the VR headset. A detected change in spatial position and/or orientation, i.e. a form of movement, may result in a corresponding change in the visual data to reflect a position or orientation transformation of the user with reference to the space into which the visual data is projected. This allows VR content data to be consumed with the user experiencing a 3D VR environment.

In the context of volumetric VR spaces or worlds, this means that the user's position can be detected relative to content provided within the volumetric VR content, e.g. so that the user can move freely within a given VR space or world, around individual objects or groups of objects, and can view the objects from different angles depending on the rotation of their head. In example embodiments to be described later on, the user may also view and explore a plurality of different VR spaces or worlds and move from one VR space or world to another one.

Audio data may also be provided to headphones provided as part of the VR headset 20. The audio data may represent spatial audio source content. Spatial audio may refer to directional rendering of audio in the VR space or world such that a detected change in the user's spatial position or in the orientation of their head may result in a corresponding change in the spatial audio rendering to reflect a transformation with reference to the space in which the spatial audio data is rendered.

The angular extent of the environment observable through the VR headset 20 is called the visual field of view (FOV). The actual FOV observed by a user depends on the inter-pupillary distance and on the distance between the lenses of the VR headset 20 and the user's eyes, but the FOV can be considered to be approximately the same for all users of a given display device when the VR headset is being worn by the user.

Referring to FIG. 2, a remote content provider 30 may store and transmit streaming VR content data which, in the context of example embodiments, is volumetric VR content data for output to the VR headset 20. Responsive to receive or download requests sent by the VR media player 10, the content provider 30 streams the VR data over a data network 40, which may be any network, for example an IP network such as the Internet.

The remote content provider 30 may or may not be the location or system where the VR video is captured, created and/or processed.

For illustration purposes, we may assume that the content provider 30 also captures, encodes and stores the VR content, as well as streaming it responsive to signals from the VR display system 1.

Referring to FIG. 3, an overview of a conventional VR capture scenario 31 is shown.

The VR capture scenario 31 is shown together with a capturing, encoding and storing module 32 and an associated user interface 39. FIG. 3 shows in plan-view a real world space 33 which may be for example a concert hall or other music venue. The capturing, encoding and storing module 32 is applicable to any real world space, however. A VR capture device 35 for video and possibly spatial audio capture may be supported on a floor 34 of the real-world space 33 in front of one or more objects 36, 37, 38. The objects 36, 37, 38 may be static objects or may move over time. One or more of the objects 36, 37, 38 may be a person. One or more of the objects 36, 37, 38 may be furniture. One or more of the objects 36, 37, 38 may generate audio, e.g. a singer, a performer or a musical instrument.

The position of the VR capture device 35 may be known, e.g. through predetermined positional data or signals derived from a positioning tag on the VR capture device. The VR capture device 35 in this example may comprise multiple cameras distributed around a body of the VR capture device and a microphone array configured to provide spatial audio capture.

One or more of the objects 36, 37, 38 may carry a positioning tag. A positioning tag may be any module capable of indicating through data its respective spatial position to the capturing, encoding and storing module 32. For example a positioning tag may be a high accuracy indoor positioning (HAIP) tag which works in association with one or more HAIP locators within the space 33. HAIP systems use Bluetooth Low Energy (BLE) communication between the tags and the one or more locators. For example, there may be four HAIP locators mounted on, or placed relative to, the VR capture device 35. A respective HAIP locator may be to the front, left, back and right of the VR capture device 35. Each tag sends BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

The capturing, encoding and storing module 32 is a processing system, possibly having an associated user interface (UI) 39 which may be used by an engineer or mixer to monitor and/or modify any aspect of the captured video and/or audio. As shown in FIG. 3, the capturing, encoding and storing module 32 receives as input from the VR capture device 35 spatial video data (and possibly audio data) and positioning data, through a signal line 41. Alternatively, the positioning data may be received from a HAIP locator. The capturing, encoding and storing module 32 may also receive as input from one or more of the objects 36, 37, 38 audio data and positioning data from respective positioning tags through separate signal lines. The capturing, encoding and storing module 32 generates and stores the VR video and audio data for output to a user device 19, such as the VR system 1 shown in FIGS. 1 and 2, via a signal line 45.

The input audio data may be multichannel audio in loudspeaker format, e.g. stereo signals, 4.0 signals, 5.1 signals, Dolby Atmos® signals or the like. Instead of loudspeaker format audio, the input may be in the multi microphone signal format, such as the raw eight signal input from the Nokia OZO® VR camera, if used for the VR capture device 35. The microphone signals can then be rendered to loudspeaker or binaural format for playback.

Associated with the capturing, encoding and storing module 32 is a streaming system 43, for example a streaming server. The streaming system 43 may be an entirely separate system from the capturing, encoding and storing module 32. Signal line 44 indicates an input received over the network 40 from the VR system 1. The VR system 1 indicates through such signalling the data to be streamed dependent on position and/or orientation of the VR display device 20. Reference numeral 45 indicates the signal line to the network 40.

Figure 4:
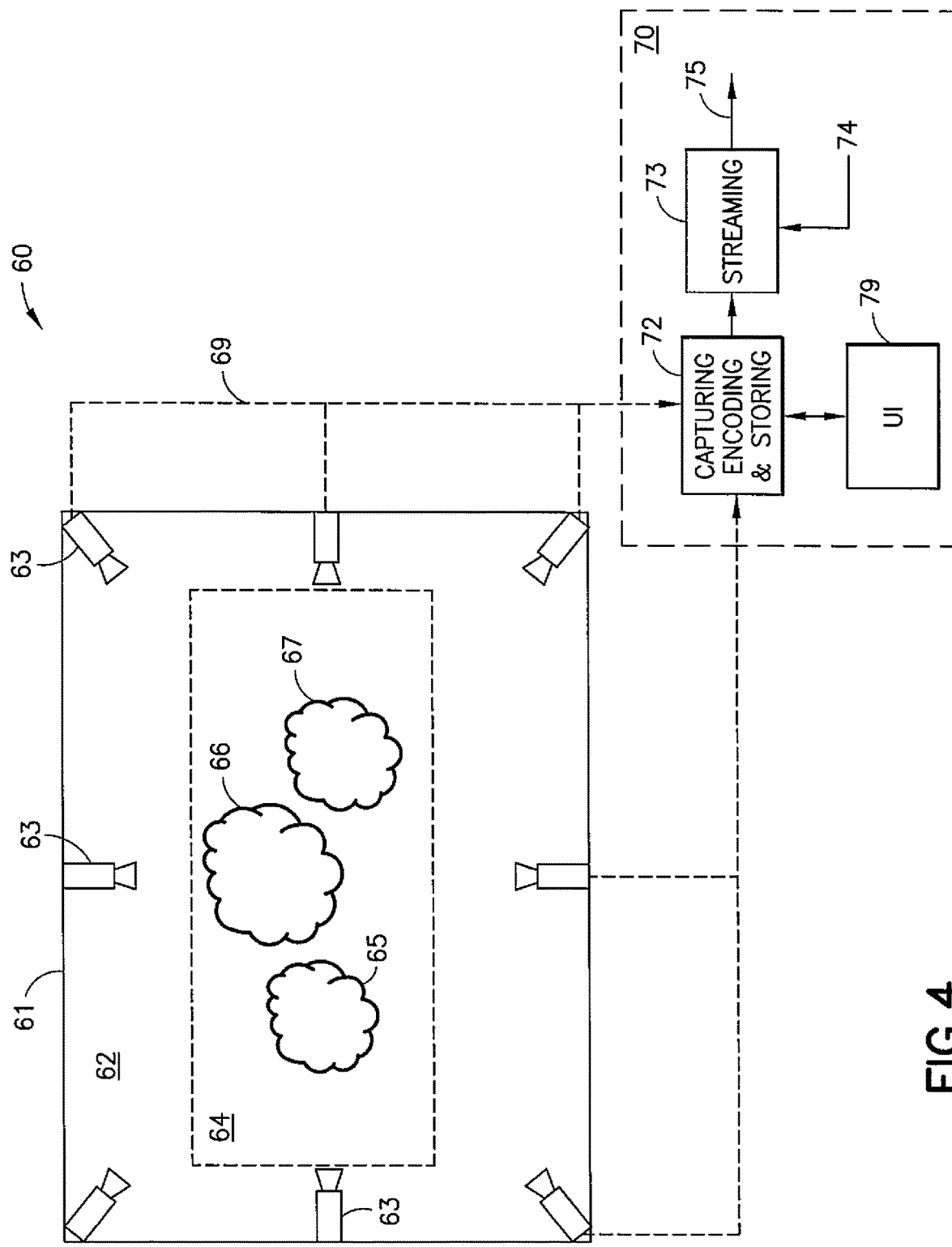
FIG. 4 is a schematic diagram of a further VR capture scenario for capturing volumetric VR content, in accordance with example embodiments of the invention.

Referring to FIG. 4, an overview of a volumetric VR capture scenario 60 is shown according to some embodiments. The capture scenario 60 is shown together with processing modules provided at a content provider system 70, including a capturing, encoding and storing module 72 and an associated user interface 79, which is optional. FIG. 4 shows in plan-view a real world space 61 which may be for example a garden comprising three trees 65, 66, 67. The capturing, encoding and storing module 72 is applicable to any real world space, however. In this case, multiple cameras 63 are positioned around the real-world space 61 (and may be positioned at different heights) so as to capture video from a focal capture zone 64 from all sides in order to generate a full three-dimensional representation of the objects 65, 66, 67 within the focal capture zone. It will be appreciated that a greater, or a fewer number of cameras 63 may be provided in practice. In some example embodiments, one or more microphones (not shown) may also be provided for capturing spatial audio. The dimensions of the focal capture zone 64 may be larger or smaller.

Similar to the FIG. 3 scenario, the capturing, encoding and storing module 72 is a processing system which may have an associated user interface (UI) 79 which may be used by an engineer or mixer to monitor and/or modify any aspect of the captured video and/or audio. As shown in FIG. 4, the capturing, encoding and storing module 72 receives as input from the cameras 63 the video data. The video data may be received using signal line(s) 69, only a subset of which are shown, and/or by wireless means. The respective position of each camera 63 may be predetermined, or, in some example embodiments, each camera may have an associated positioning tag (e.g. a HAIP positioning tag) used to indicate the position of each camera in the real-world space 61. If audio data is provided, the capturing, encoding and storing module 72 may also receive as input audio data using wired or wireless means. The capturing, encoding and storing module 72 processes the received video data, and possibly audio data, to generate using known techniques a volumetric three-dimensional world representing the focal capture zone 64. This captured 'virtual world' is stored for output to a user device, such as the VR system 1 via signal line 75.

Similar to the FIG. 3 scenario, if audio is captured, the audio data may be multichannel audio in loudspeaker format, e.g. stereo signals, 4.0 signals, 5.1 signals, Dolby Atmos® signals or the like. Instead of loudspeaker format audio, the input may be in the multi microphone signal format, such as the raw eight signal input. The microphone signals can then be rendered to loudspeaker or binaural format for playback.

Similar to the FIG. 3 scenario, associated with the capturing, encoding and storing module 72 is a streaming system 73, for example a streaming server. The streaming system 73 may be an entirely separate system from the capturing, encoding and storing module 72. Signal line 74 indicates an input received over the network 40 from the VR system 1. As will be explained, the VR system 1 indicates through such signalling video data to be streamed dependent on position and/or orientation of the VR headset 20 within a corresponding VR space. Reference numeral 75 indicates the signal line to the network 40.

In example embodiments herein, the capturing, encoding and storing module 72 stores a plurality of virtual worlds, each of which may represent different volumetric VR content.

Figure 5:
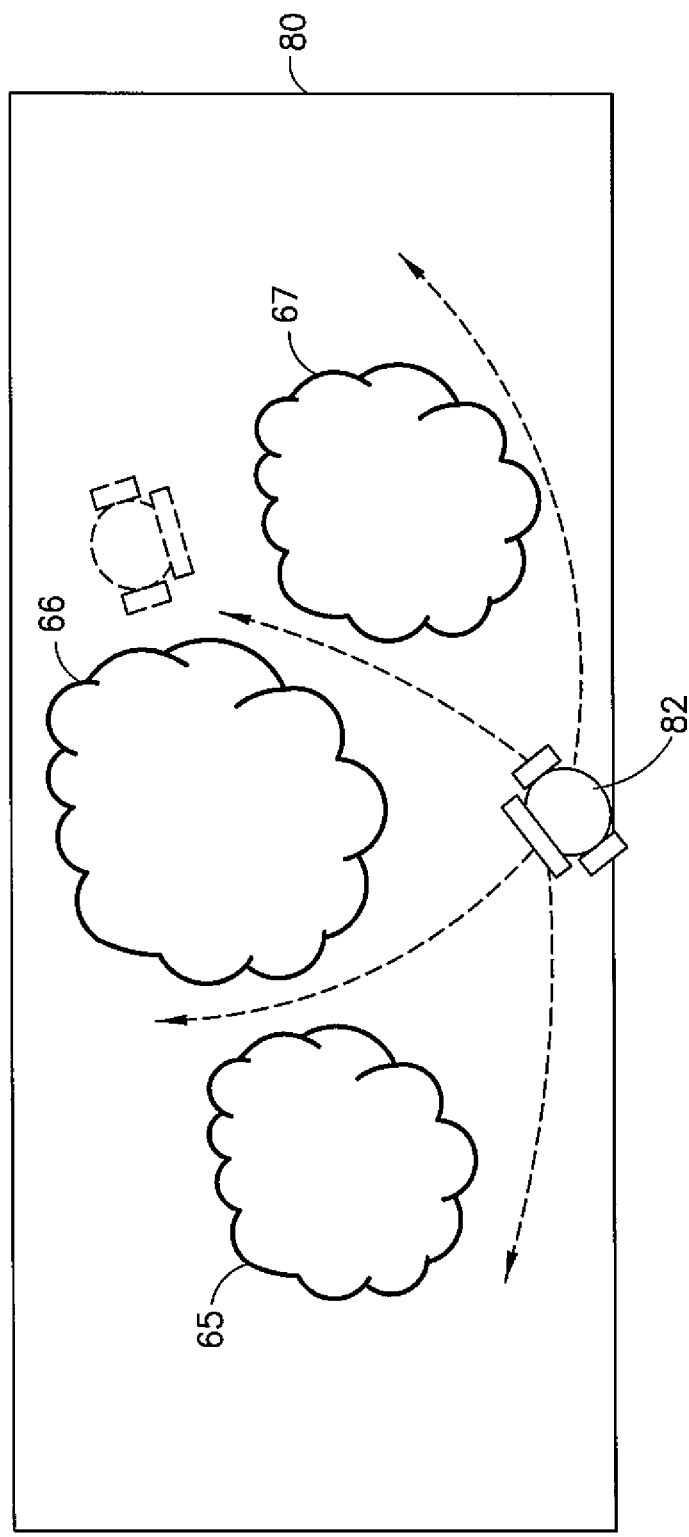
FIG. 5 is a top plan view of a first virtual world, and overlaid first and second positions of a user immersed in the first virtual world.

FIG. 5 shows in top-plan view a first example virtual world 80, captured using, for example, the FIG. 4 scenario 60, although other methods of generating the virtual world may be used. The virtual world 80 comprises a three-dimensional, volumetric representation of a garden comprising the first, second and third trees 65, 66, 67. Also shown is the relative position of a user 82 wearing the VR headset 20 when in a first position and in a subsequent, second position indicated by broken lines. The broken arrows indicate that the user 82 may move freely around the trees 65, 66, 67 and view them from all directions and orientations.

Figure 6A:
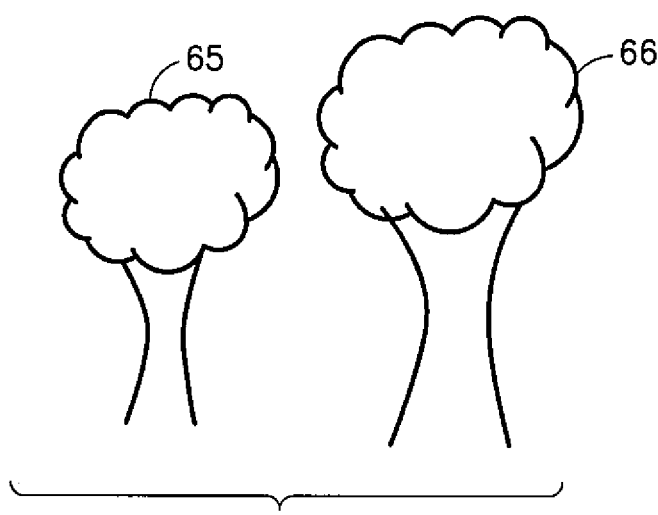
FIGS. 6a and 6b are user viewpoints of the FIG. 5 first virtual world at the respective first and second positions.
Figure 6B:
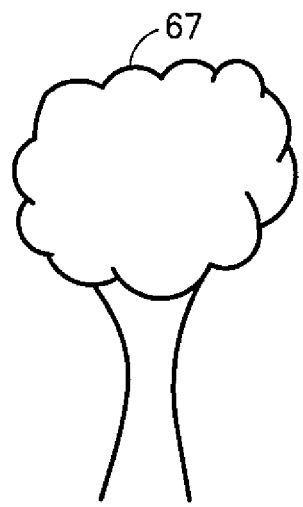

FIG. 6a is a graphical view of VR content data which is rendered to the VR headset 20 when the user 82 is in the first position. Particularly, the three-dimensional image that is rendered to the VR headset 20 will be the first and second trees 65, 66. FIG. 6b is a graphical view of what is rendered to the VR headset 20 when the user 82 is in the second position, having rotated their body towards the rear of the third tree 67.

Figure 7:
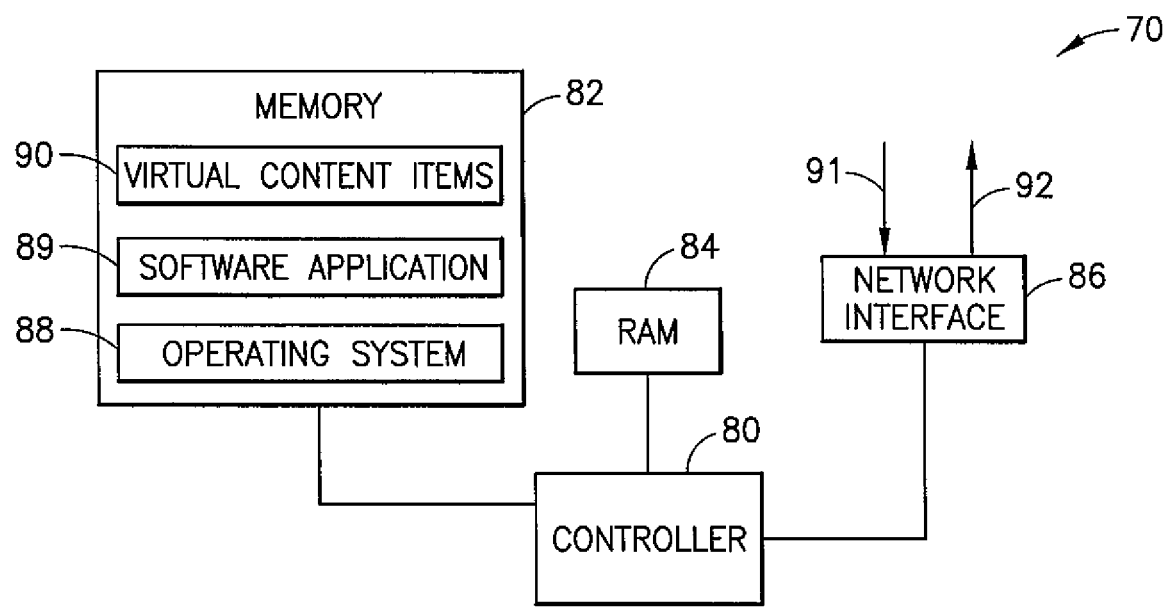
FIG. 7 is a schematic diagram of components of a content provider system shown in FIG. 4.

FIG. 7 is a schematic diagram of components of the content provider system 70. The content provider system 70 may have a controller 80, a memory 82 and RAM 84. The content provider system 70 may comprise a network interface 86 for connection to the network 40, e.g. a modem which may be wired or wireless. The content provider system 70 may also receive positional signals from the VR headset 20 over signal line 74 and outputs streaming content for one or more virtual worlds over signal line 75. The positional signals may be indicative of user position/orientation. The output signals to the display device 10 will be the VR content data. The controller 80 is connected to each of the other components in order to control operation thereof.

The memory 82 may be a non-volatile memory such as read only memory (ROM), a hard disk drive (HDD) or a solid state drive (SSD). The memory 82 stores, amongst other things, an operating system 88 and may store software applications 89. The RAM 84 is used by the controller 80 for the temporary storage of data. The operating system 88 may contain code which, when executed by the controller 80 in conjunction with the RAM 84, controls operation of each of the hardware components. Additionally, the memory 82 stores a set of virtual content items 90 (hereafter "virtual items") which may be a library of virtual items arranged in any suitable form. The virtual items go may comprise three-dimensional volumetric items, for example virtual worlds and/or objects.

The controller 80 may take any suitable form. For instance, it may be a microcontroller, plural microcontrollers, a processor, or plural processors.

In some example embodiments, the content provider system 70 may also be associated with external software applications or VR content data not stored on the memory 82. These may be applications or VR content data stored on a remote server device and may run partly or exclusively on the remote server device. These applications or VR content data may be termed cloud-hosted applications or data. The content provider system 70 may be in communication with the remote server device in order to utilize the software application or data stored there.

In some example embodiments, the components shown in FIG. 7 may be provided at the media player 10 (without the need for the network interface 86) so that the functionality described herein is provided locally rather than remotely.

One software application 89 provided on the memory 82 is for controlling what is transmitted and rendered to the VR system 1.

Real-world spaces such as those in which a user will be wearing the VR headset 20 are usually limited in size and/or may contain one or more objects. For example, the objects may comprise furniture and/or fixtures and fittings. The objects may be moveable or non-movable. Accordingly, certain ones of the virtual items 90 stored in the library may or may not be suitable for rendering to the VR headset 20 because of the limited space and/or the presence of objects in the space. This is particularly the case for volumetric and/or 6DoF applications where the user may move in translation as well as orientation in the real-world space. The presence of an object may for example limit the user's ability to move and/or may present a trip hazard.

Figure 8:
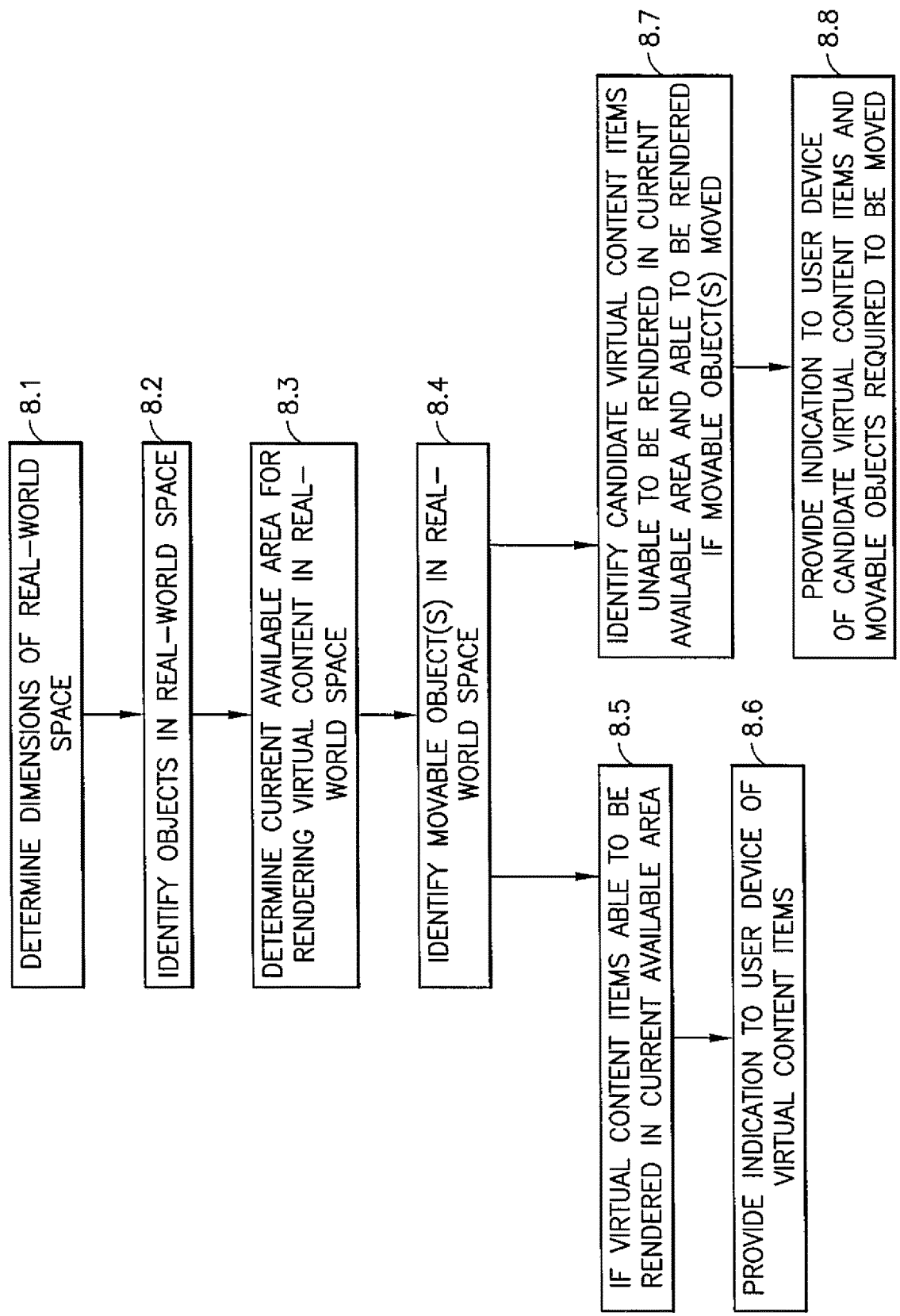
FIG. 8 is a flow diagram showing processing steps of a method in accordance with an example embodiment of the invention.

FIG. 8 is a flow diagram showing processing steps performed by the software application 89. Certain steps may be re-ordered, re-arranged and/or combined.

In a first step 8.1, the software application 89 is configured to determine the dimensions of the real-world space, e.g. within which a virtual world is to be consumed. In a subsequent step 8.2, the software application 89 may identify one or more objects within said real-world space. In a subsequent step 8.3, the software application 89 may determine the current available area within the real-world space for rendering virtual content. The current available area is the area (or volume) of the real-world space resulting from subtracting the footprint (or volume) of identified objects from the overall area (or volume) of the real-world space. In a subsequent step 8.4, the software application 89 may identify one or more of the objects as being movable. In a subsequent step 8.5, it is determined if one or more of the virtual items 90 are suitable for rendering in the current available area. If so, a subsequent step 8.6 generates an indication for display to the VR headset 20 of the one or more virtual items 90 identified in step 8.5.

A further step 8.7 identifies one or more "candidate" virtual items from said set of virtual items 90. A candidate virtual item is one that is unsuitable to be rendered in the current available area determined in step 8.3, but which can be rendered if one or more of the movable objects identified in step 8.4 is or are moved.

For the avoidance of doubt, moving an object may include movement within the real-world space and also removal from the real-world space.

A subsequent step 8.8 generates an indication for display to the VR headset 20 of the one or more candidate virtual items. Note that steps 8.7 and 8.8 may be performed in parallel with, or subsequent to, steps 8.5 and 8.6. By providing such an indication, the user knows how to view additional virtual items by moving or removing certain objects and may therefore avoid the risk of a trip hazard.

In step 8.1, the dimensions of the real-world space may be determined using any suitable means. For example, the dimensions may be entered manually by a user through a user interface. The user may estimate or measure the dimensions. In some example embodiments, the dimensions may be determined electronically using one or more cameras or depth sensors, e.g. LiDAR sensors. As will be known, LiDAR is a surveying method that measures distance to a target by illuminating the target with laser light and measuring the reflected light. Other similar methods may be used, for example using ultrasonic sensors. The dimensions of the real-world space may comprise a measure of length, width and height.

In step 8.2, the one or more objects may be identified in video data received from one or more cameras in the real-world space. Visual object detection is well-known and typically comprises feature extraction, convolutional neural networks or similar learning models. In some example embodiments, objects may be classified into semantic classes. In some example embodiments, objects may be tracked as they move over time to identify movement and possibly movement vectors. In some example embodiments, step 8.2 may comprise using object detection with other sensors, for example using LiDAR sensors or Microsoft's Kinect® sensor.

In step 8.3, the current available area may be based at least partly on the dimensions of the real-world space. In some example embodiments, the current available area may also be based on the presence of one or more non-movable objects in the real-world space. In this respect, the software application 89 may be configured to identify or estimate which of the objects identified in step 8.2 are movable and non-movable. Non-movable objects may comprise stationary fixtures and fittings such as chimneys, fireplaces, electrical installations etc. Non-movable objects may also comprise heavy objects.

The presence of at least one non-movable object in the real-world space may require a calculation of the current available area by on subtracting the dimensions of the non-movable object(s) from the dimensions of the real-world space. The current available area may comprise a two-dimensional area or a three-dimensional volume.

One method for identifying movable objects is to monitor the or each object over a period of time. If an object moves over that time period, it is classified as movable and as immovable if it does not move. A more detailed description of another method for identifying movable objects is provided later on.

Figure 9:
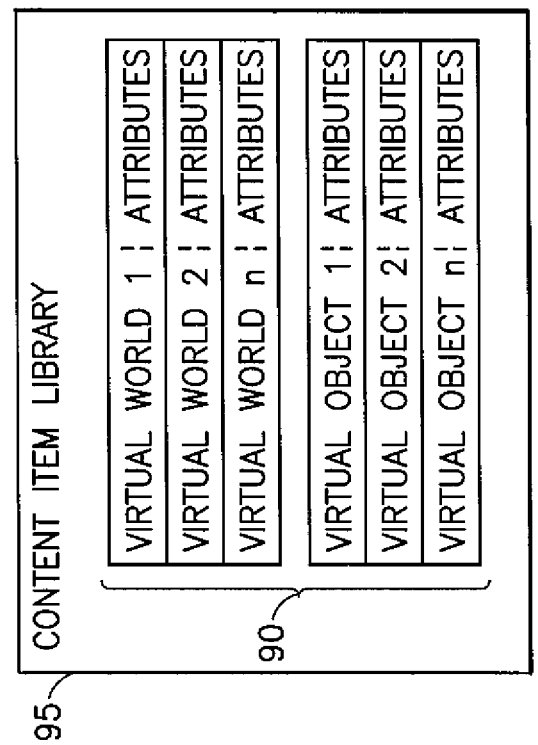
FIG. 9 is a schematic diagram of a content item library storing multiple sets of virtual content for use in example embodiments of the invention.

FIG. 9 is a schematic diagram of a virtual item library 95 comprising multiple virtual items, such as virtual worlds and virtual objects. For example, a first virtual world may represent a beach scene; a second virtual world may comprise a mountain range; and a third virtual world may comprise a city scape. Associated with each virtual item is a set of attributes which may comprise metadata. For example, one attribute may comprise the dimensions of the respective virtual item. For example, the virtual worlds may have an associated length, width and height. Other attributes may comprise the footprint that the virtual worlds will occupy on the floor of a real-world space. Other attributes may comprise keywords or other contextual information which may be useful in searching for particular virtual items and determining relevance to a search term.

Figure 10:
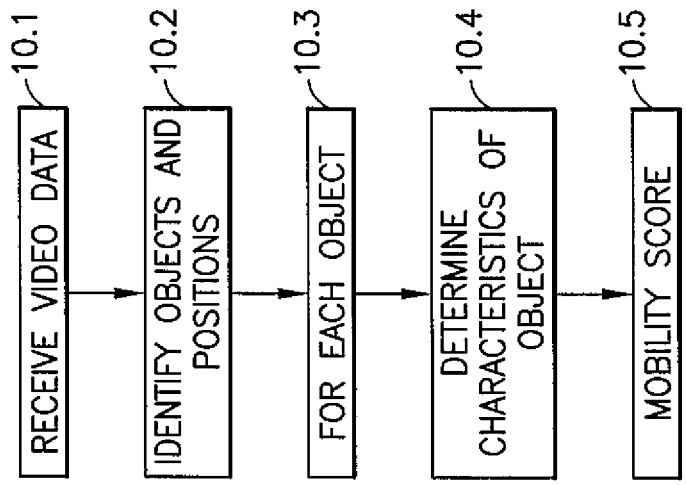
FIG. 10 is a flow diagram showing processing steps of one or more stages of the FIG. 8 method.

FIG. 10 is a flow diagram showing processing steps performed by the software application 89 in performing step 8.4, i.e. identifying one or more movable objects in the real-world space. A first step 10.1 comprises receiving the video data from the one or more cameras in the real-world space. A subsequent step 10.2 comprises identifying one or more objects and their respective positions within the real-world space.

For example, using known visual object detection, classification and tracking methods, the software application 89 may generate object "type" and position data.

A subsequent step 10.3 comprises taking each object in turn and, in step 10.4, determining characteristics of the object. In this respect, object characteristics may comprise any measureable or observable characteristic that may be associated with the object. For example, the size of the object may be a determined characteristic. The generated data may therefore comprise, for two example objects:
1 type: chair, id: chair_01 position, (x,y,z): (1.0, 3.2, 2.2), size (x,y,z) (0.4, 0.4, 1.0),
2 type: sofa, id: sofa_01, position (x,y,z): (2.0, 0.2, 3.2), size (x,y,z) (2.4, 1.0, 1.3).

A subsequent step 10.5 comprises determining a mobility score for the object. It will be appreciated that steps 10.1 and 10.2 may be based on step 8.2 of the FIG. 8 method.

Figure 11:
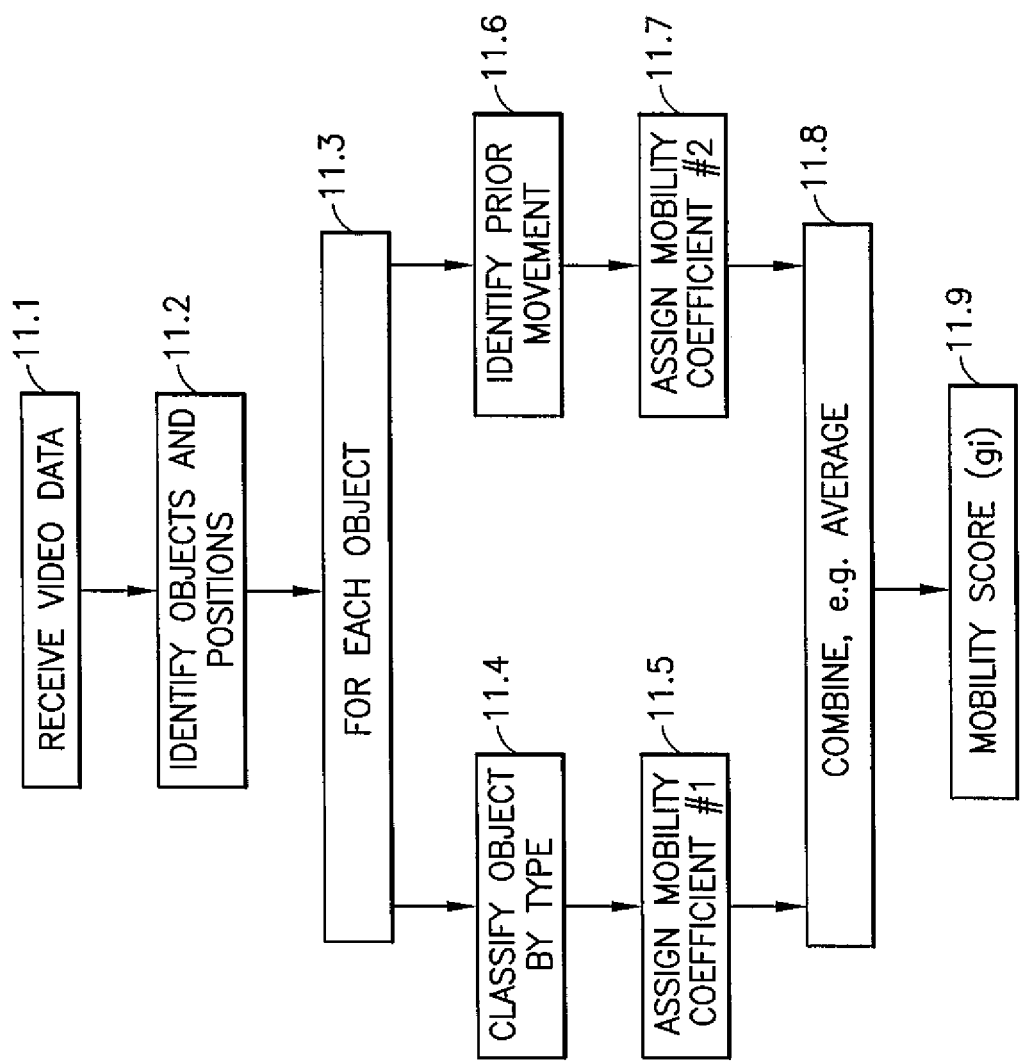
FIG. 11 is a flow diagram showing processing steps of a more detailed example embodiment of the FIG. 10 method.

FIG. 11 is a flow diagram showing processing steps performed by the software application 89 in a more detailed example embodiment. Steps 11.1, 11.2 and 11.3 correspond to steps 10.1, 10.2 and 10.3 respectively. Steps corresponding to determining characteristics of each object are performed in steps 11.4-11.7. In this example embodiment, the characteristics relate to object type and object movement. A mobility score may be assigned to the object based on the determined characteristic(s). If more than one mobility score is assigned, the mobility scores may be combined using a combination function, e.g. an averaging function, to generate an overall mobility score which determines how moveable the object is. An object may be considered movable (or non-movable) dependent on the mobility score being above (or below) a predetermined threshold.

For example, step 11.4 comprises classifying the object according to type. This characteristic may be determined using a convolutional neural network to recognise which one of a plurality of classes the detected object belongs to. Depending on the object class, a mobility coefficient is assigned in step 11.5. The mobility coefficient may reflect how mobile, or how easy it is to move, the object. Put another way, the mobility coefficient may reflect the probability of the user moving the object if requested by the software application 89. Predetermined mobility coefficients may be associated with different object types. For example, a chair may have a predetermined mobility coefficient (0.9) which is higher than that of a large sofa (0.1).

The predetermined mobility coefficients may be estimated based on data collected from a large number of users. The coefficients may be provided in a look up table (LUT) stored in the memory 82 of the system 70. If an object type is not stored in the LUT, its size may be used to determine the coefficient. The larger the object, the smaller the coefficient.

Step 11.6 comprises identifying prior movement of the object. This may comprise comparing the position of an object with historical position data, e.g. stored for a plurality of prior image frames. The position data may be determined from the image data itself and/or from a positioning tag, e.g. HAIP tag, carried by one or more objects. Step 11.7 comprises assigning a different mobility coefficient based on the movement. If an object does not change position over a predetermined time frame, then it will be assigned a zero, or low, coefficient. If an object changes position frequently, or by a significant amount, the coefficient will be high. In some example embodiments, if the software application 89 has previously prompted movement of the object, the coefficient may also be increased.

Step 11.8 comprises combining the assigned mobility coefficients from steps 11.5 and 11.7. In this example, the two coefficients are averaged. In step 11.9 a mobility score $g_i$ is generated and assigned to the object.

In some example embodiments, users may be able to search for virtual items 90 stored in the library 95. For example, a user may enter one or more search terms using a user interface provided with the VR display system 1. The user interface may be part of the application program 89 or another program provided on the VR media player 10. A keyboard or other device for textual input may be associated with the VR media player 10 for receiving search terms which are transmitted to, and processed by, the software application 89. Alternatively, or additionally, search terms may be entered using voice input. For example, a microphone may be provided within the VR headset 20 and speech from a user transmitted to the software application 89 which employs voice recognition techniques for identifying one or more search terms.

Figure 12:
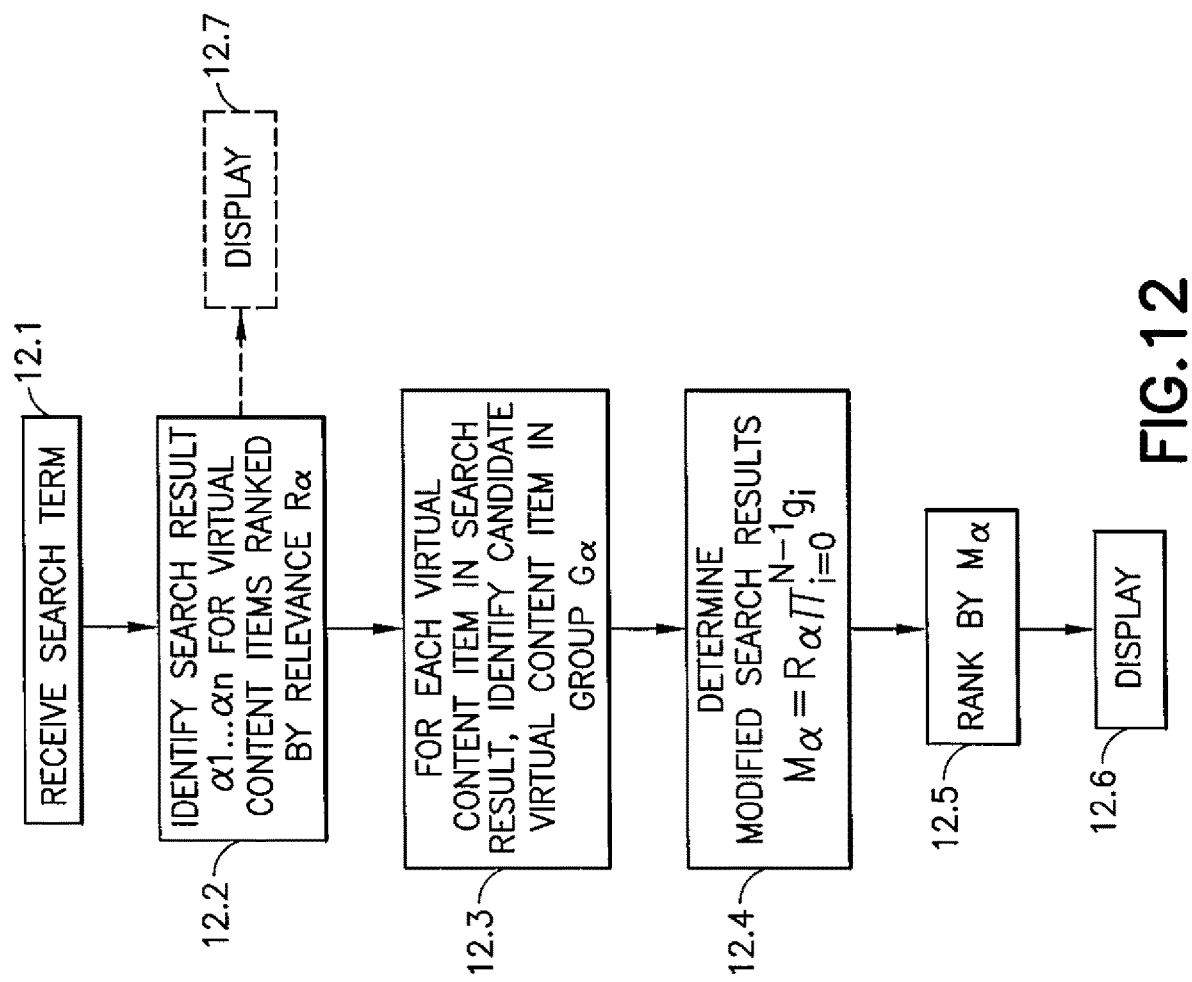
FIG. 12 is a flow diagram showing processing steps of a searching method according to another example embodiment of the invention.

FIG. 12 is a flow diagram showing processing steps performed by the software application 89 in processing the one or more search terms. A first step 12.1 receives a search term, which may comprise alphanumeric characters. A subsequent step 12.2 applies the search term to the virtual items 90, for example metadata within the attribute data shown in FIG. 9, using one or more conventional relevance algorithms. Such algorithms may identify matches between characters/words or similarity between characters/words. A relevance score $R_a$ between zero and one may be assigned to each of the virtual items 90, reflecting the degree of relevance. An initial set of search results $\alpha_1 \ldots \alpha_n$ is produced and ranked by their respective relevance score $R_a$.

A subsequent step 12.3 determines, for each virtual item a in the search results, a group $G_a$ of one or more of movable objects that would be needed to move in order to leave available space for the associated virtual content.

A subsequent step 12.4 determines modified search results, based on modifying the relevance score $R_a$ by the mobility of the one or more objects in the associated group $G_a$. For example, the modified search result $M_a$ may be calculated as:

$$M_a = R_a \Pi_{i=0}^{N-1} g_i$$

where N is the number of movable objects in the group $G_a$.

A subsequent step 12.5 may re-rank the modified search results $M_a$ and send the result for display at the VR headset 20 in a subsequent step 12.6. Optionally, the original search results $\alpha_1 \ldots \alpha_n$ may initially be displayed in step 12.7 as shown.

An example of the above-described method and system will now be described with reference to FIGS. 13 to 16.

Figure 13:
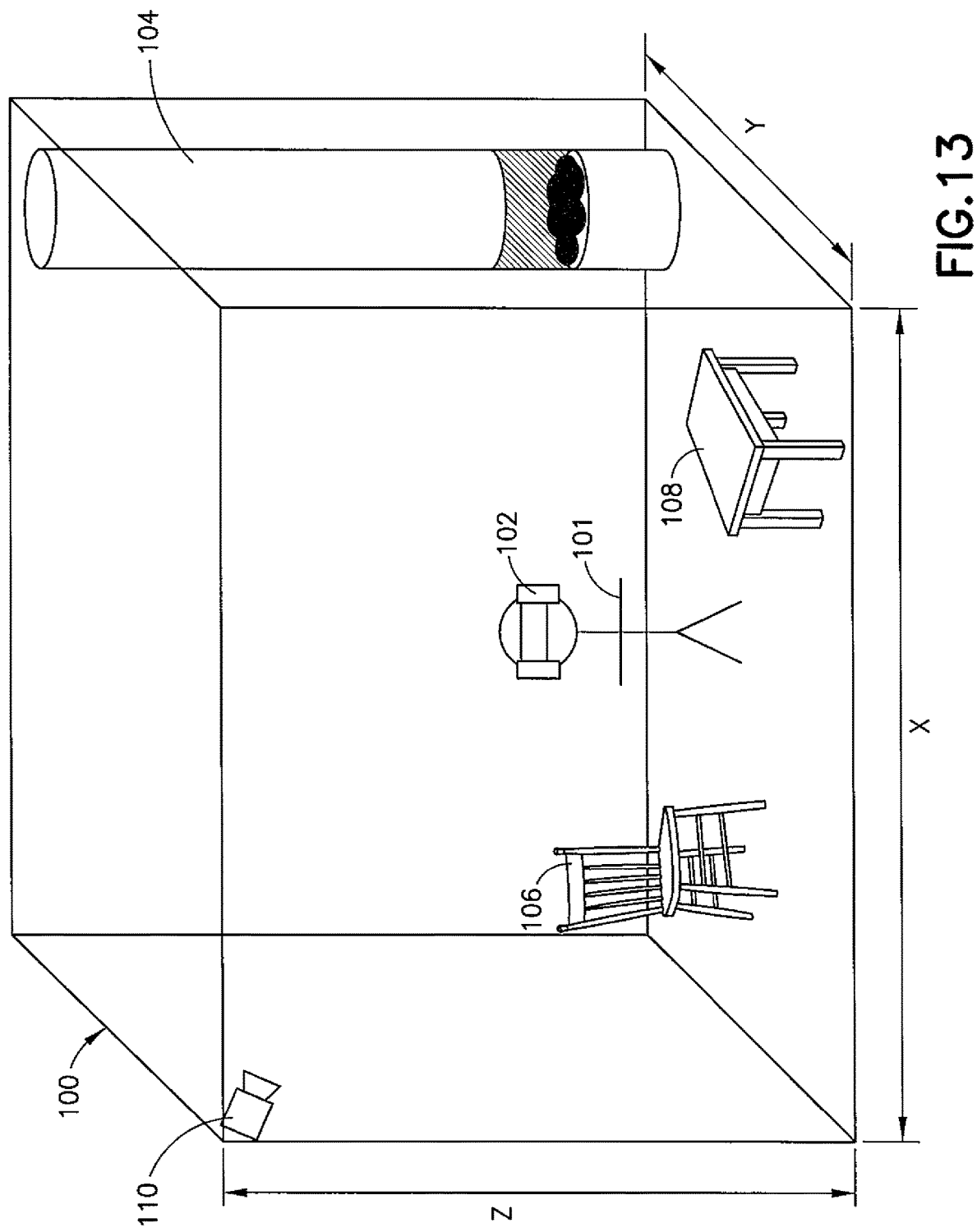
FIG. 13 is a perspective view of a real-world space comprising a plurality of objects, useful for understanding example embodiments of the invention.

FIG. 13 shows an example real-world space 100 within which a user 101 may consume virtual content using a VR headset 102 which forms part of the FIG. 1 VR display system. The dimensions of the real-world space 100 may be determined using the x, y and z measurements, e.g. to derive the floor area and/or volume of the space using any of the aforesaid methods. Within the real-world space 100 are a plurality of objects, comprising a chimney 104, a chair 106 and a table 108. At least one video camera 110 is provided within the real-world space 100, and may be used in determining the presence and position of the respective objects 104, 106, 108 and their movement (if any) over time.

In the shown example embodiment, the chimney is a fixed object 104 and the chair 106 and table 108 are movable objects.

FIGS. 14a-14d show in graphical form how the current and modified available areas are determined and used in subsequent steps.

Figure 14A:
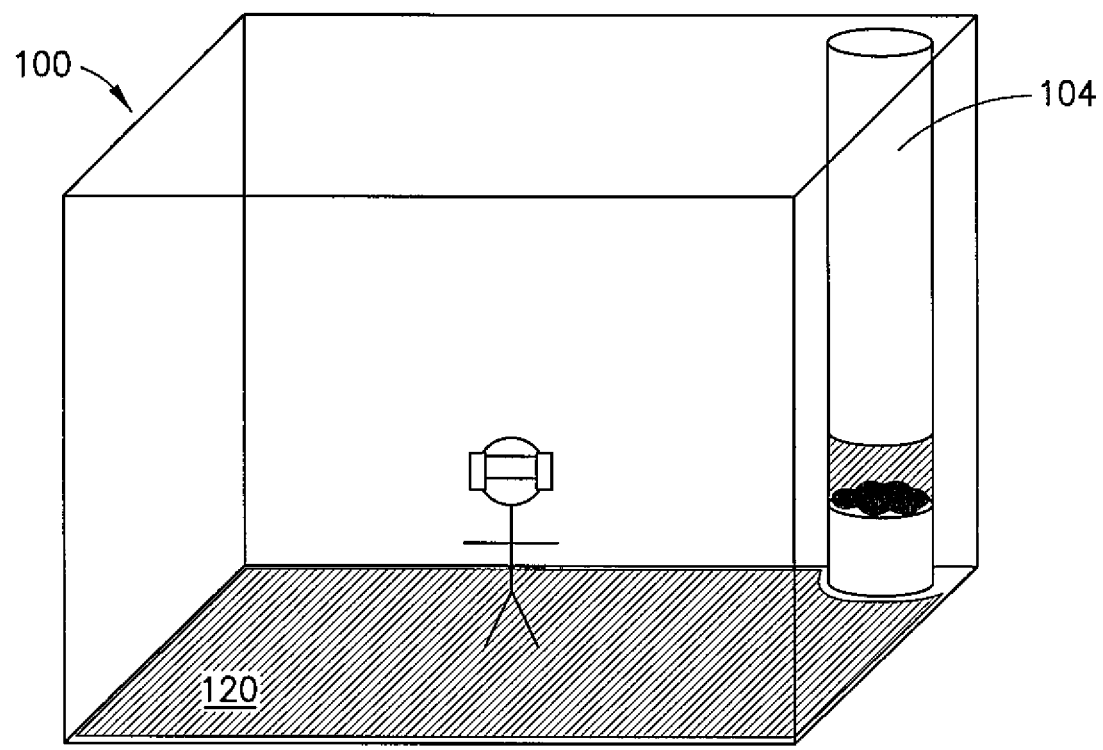
FIGS. 14a-14d are perspective views of the FIG. 13 real-world space respectively indicating available areas resulting from the removal of one or more objects.
Figure 14B:
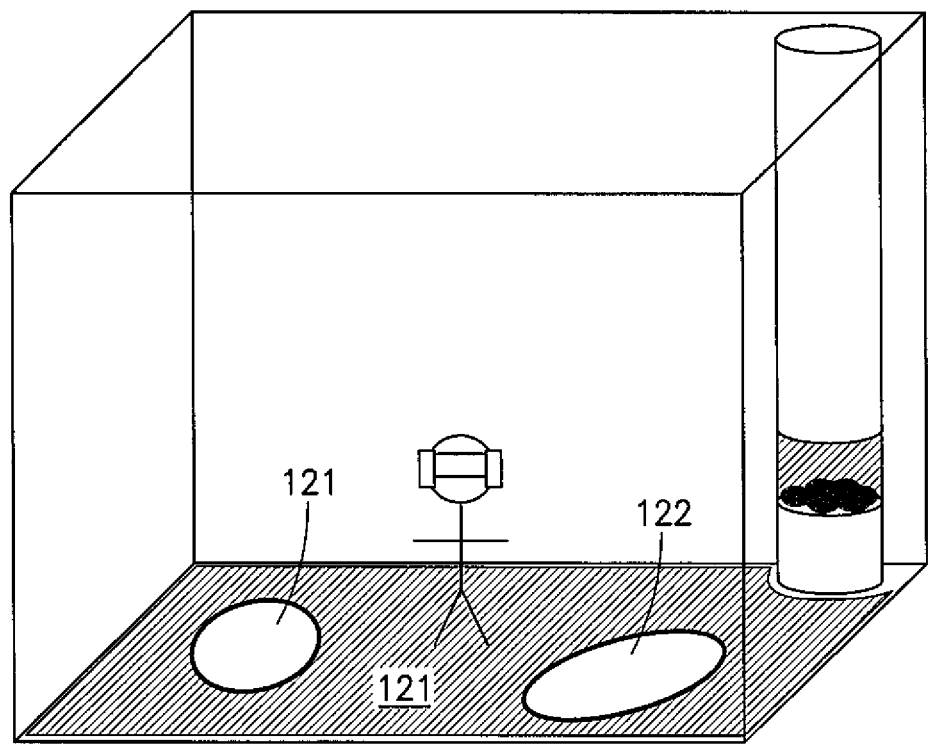
Figure 14C:
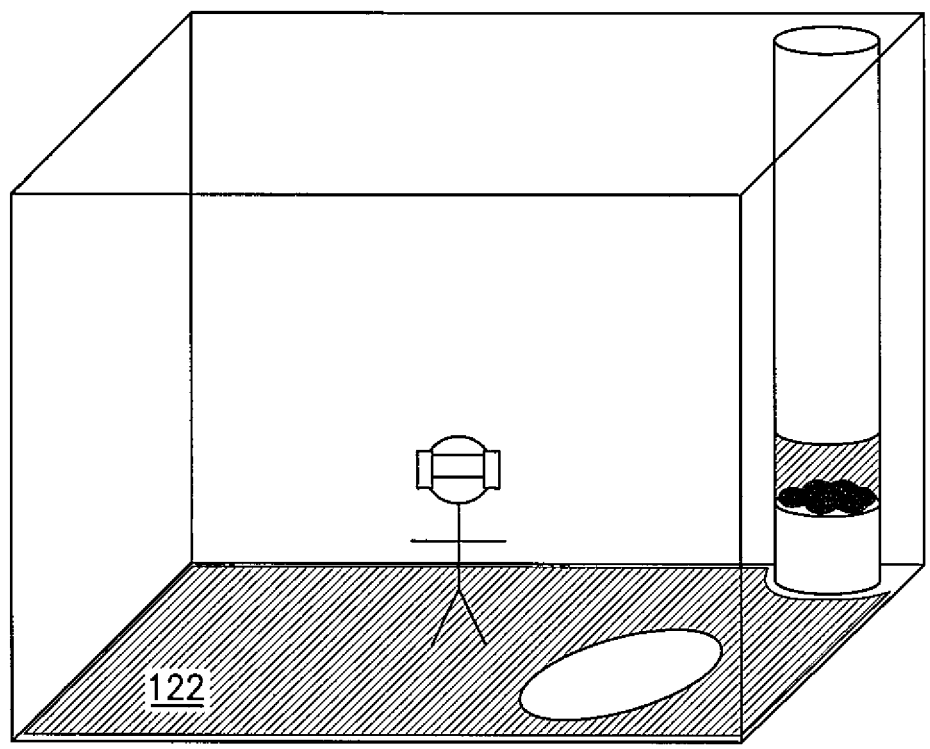
Figure 14D:
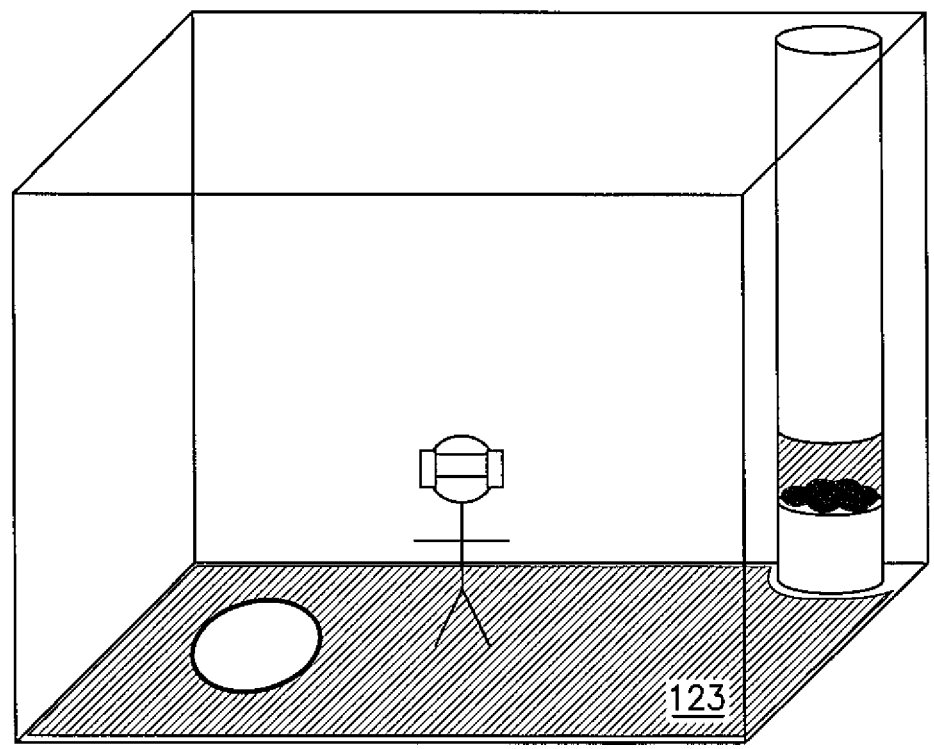

FIG. 14a shows the total available area 120 within the real-world space 100 comprising the overall floor area (the x-axis measurement multiplied by the y-axis measurement) minus the footprint of the stationary chimney object 104 which is estimated using video data captured by the camera 110. The total available area 120 therefore represents the maximum area in which virtual items may be rendered if all movable objects are removed. FIG. 14b shows the current available area 121 comprising the total available area 120 minus the respective footprint areas 121A, 121B of the chair 106 and table 108 objects. The current available area 121 represents the maximum area within which a candidate virtual item may be rendered without moving or removing the chair 106 and table objects 108. FIG. 14c shows the available area 122 if only the chair 106 is removed. FIG. 14d shows the available area 123 if only the table is removed. It will be appreciated that a greater number of available areas may be determined if more movable objects are present and/or if objects are moved, rather than removed, to different positions within the real-world space 100. For example, if the chair 106 were moved closer to the corner of the real-world space 100, the modified available area may be suitable for certain candidate virtual items.

Figure 15:
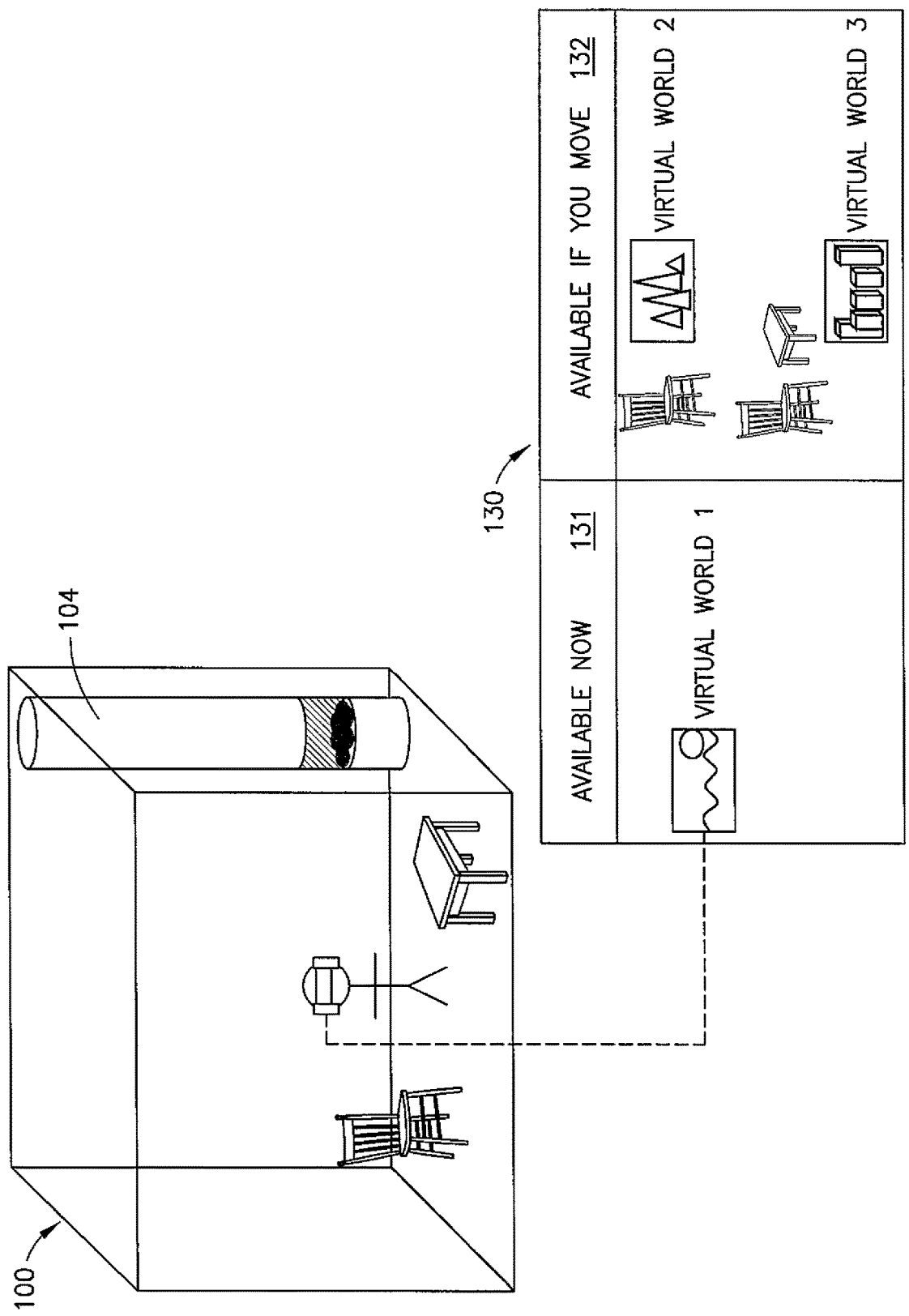
FIG. 15 is a perspective view of the FIG. 13 real-world space with an associated user interface display, useful for understanding example embodiments of the invention.
Figure 16:
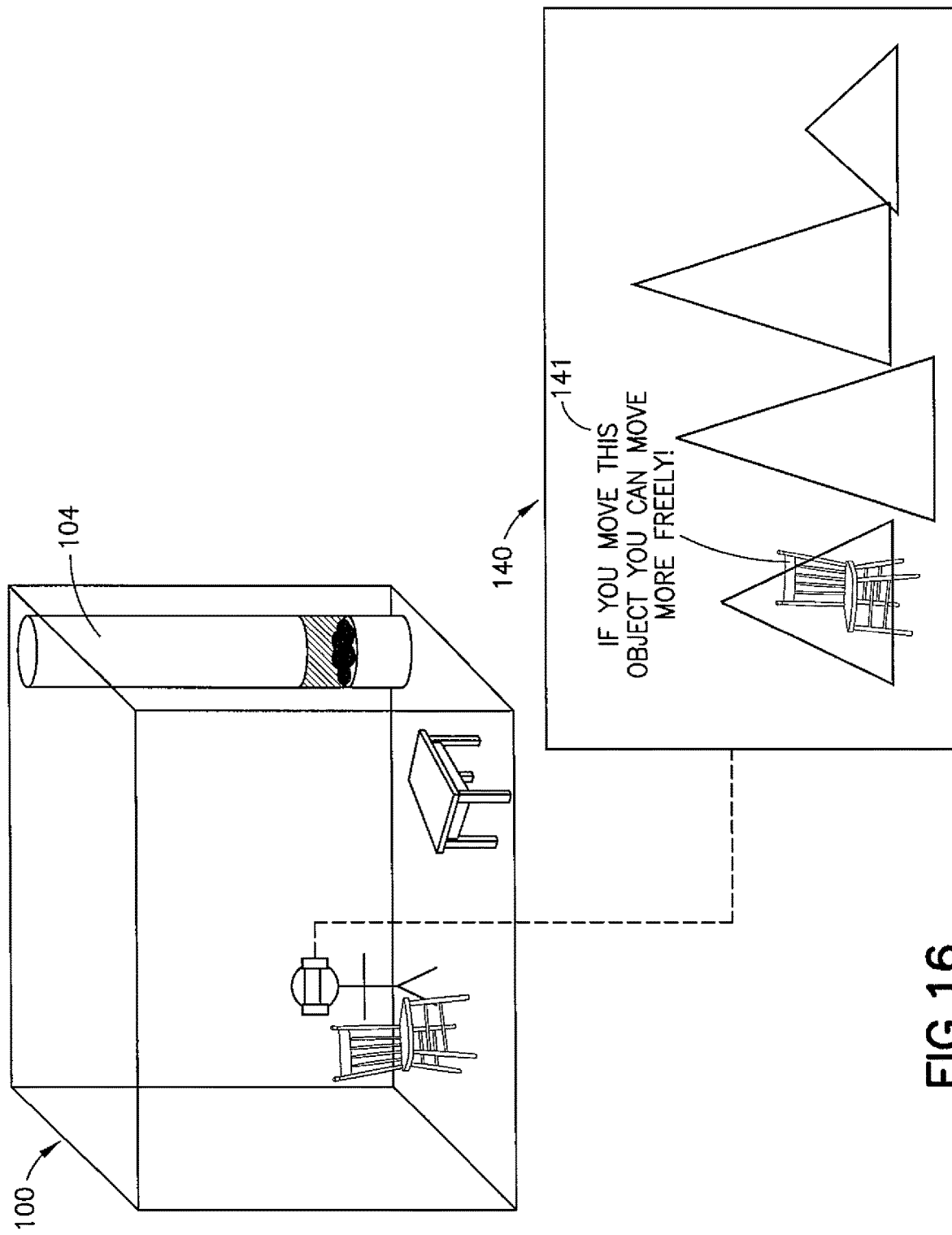
FIG. 16 is a perspective view of the FIG. 13 real-world space with an associated user interface display, useful for understanding another example embodiment of the invention.

FIG. 15 shows what information is presented by the software application 89 to the user 101 through the VR headset 20, in the form of a user interface 13o. The user interface 130 may comprise an image overlaid onto the volumetric VR content that the user 101 is currently immersed in. The user interface 130 may display representations of one or more content items that are available for rendering based on the current available area 121, shown in FIG. 14b. Said one or more content items are shown in a first column or section 131 of the user interface 130. The user interface 130 may also display representations of one or more candidate content items that are suitable for rendering if one or more movable objects are moved or removed. The particular object or objects needing moving are displayed as shown in a different column or section 132 of the user interface 130.

In some example embodiments, the indication may comprise a direction and/or degree of required movement. For example, the indication may comprise an arrow. For example, the size of the arrow may indicate the degree of required movement. For example, a numeral indication of the required movement may be provided.

In the shown example, a "Virtual World 1" has dimensions suitable for rendering within the current available area 121, whereas a "Virtual World 2" and a "Virtual World 3" have dimensions too large to be rendered within the available area 121. However, it is further determined that "Virtual World 2" may be suitable for rendering within the real world space 100 if the chair 106 is removed; this results from identifying that the dimensions of "Virtual World 2" will fit in the available space 122 shown in FIG. 14c. Similarly, "Virtual World 3" may be suitable for rendering within the real world space 100 if both the chair 106 and the table 108 are removed; this results from identifying that the dimensions of "Virtual World 3" will fit in the available space 123 shown in FIG. 14d.

One or more of the content items shown in the user interface 130 may be selectable, for example to cause rendering of the relevant content item through the VR headset 20 in the real-world space 100. For example, selection of "Virtual World 1" may result in it being rendered to the VR headset 20. Selection may be by means of a physical user controller and/or a voice instruction or any other suitable means.

In some example embodiments, selection of one or more other content items considered unsuitable for the current available area 121 may be permitted. For example, selection of "Virtual World 2" from the user interface 130 without removing the chair 106 may result in the rendered view 140 shown in FIG. 16. Whilst this may hinder user movement and/or present a trip hazard, the software application 89 may additionally provide a graphical indication 141 informing the user that movement of the chair 106 will permit freer translational movement. The graphical indication 141 may be displayed at all times, or responsive to the position of the VR headset 20 being within a predetermined distance of the chair 106. The chair 106 may be presented within the rendered view in semi-transparent form.

In some example embodiments, as a user moves a movable object, the software application 89 may update the user interface 130 or the rendered view 140 to reflect one or more new sets of content items that may be rendered.

In some example embodiments, the content items may for example be accessed through a floorplan of a user's house, office or surroundings, e.g. including the backyard. A user may browse in AR, or in a partially-transparent VR view, which volumetric content items are optimal to explore in the hallway etc.

In some example embodiments, a group of users, e.g. friends or colleagues, may receive recommendations as to a particular user's house or office (and/or room) most appropriate for explore particular content items.

Other contextual factors that may influence recommended content may include illumination or temperature. Regarding the former, if a room is particularly bright (above a predetermined luminance) certain genres of content (e.g. horror content) may not be recommended. Regarding the latter, if a room is particularly warm (above a predetermined temperature) then content related to winter scenes may not be recommended whereas content related to summer/tropical scenes may be recommended.

Figure 17:
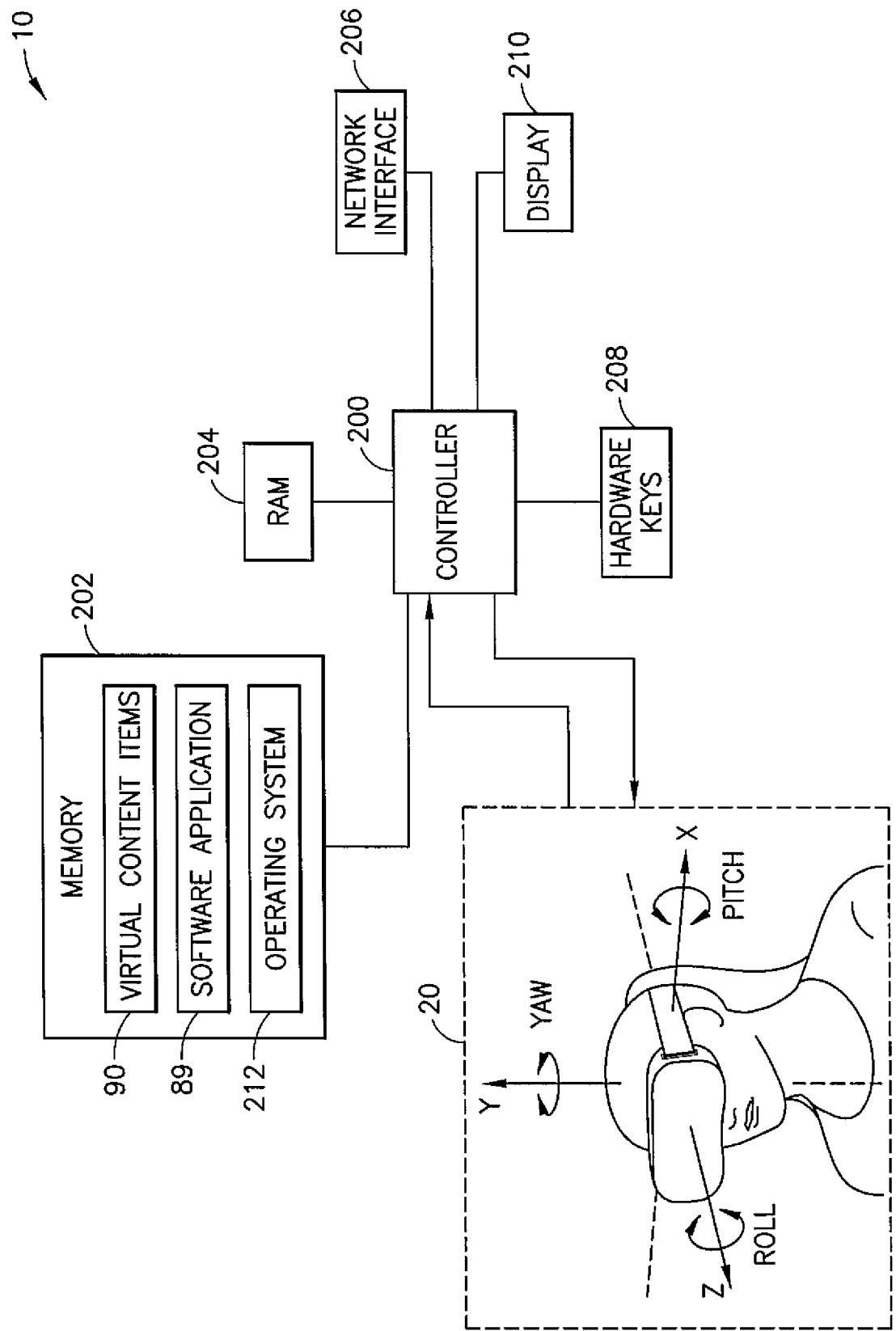
FIG. 17 is a schematic diagram of components of a VR media player in accordance with an example embodiment.

As mentioned above, in alternative example embodiments, the software application 89 and/or the virtual items go may be provided locally at the user end, for example in the VR media player 10. Accordingly, for completeness, FIG. 17 shows a schematic diagram of components of the VR media player 10. The VR media player 10 may have a controller 200, memory 202 and RAM 204. The VR media player 10 may comprise a network interface 206 for connection to the network 40, e.g. a modem which may be wired or wireless. The VR media player 10 may also receive positional signals from the VR headset 20 and outputs video and/or audio content for one or more virtual worlds to the VR headset 20. The positional signals may be indicative of user position/orientation. The controller 200 is connected to each of the other components in order to control operation thereof.

The memory 202 may be a non-volatile memory such as read only memory (ROM), a hard disk drive (HDD) or a solid state drive (SSD). The memory 202 stores, amongst other things, an operating system 212 and the software application 89. The RAM 204 is used by the controller 200 for the temporary storage of data. The operating system 212 may contain code which, when executed by the controller 200 in conjunction with the RAM 204, controls operation of each of the hardware components.

Additionally, the memory 202 may store the set of content items go which may be a library of virtual content items arranged in any suitable form. The content items 90 may comprise three-dimensional volumetric items, for example virtual worlds and/or objects.

The controller 200 may take any suitable form. For instance, it may be a microcontroller, plural microcontrollers, a processor, or plural processors.

In some example embodiments, the VR media player 10 may also be associated with external software applications or VR content data not stored on the memory 202. These may be applications or VR content data stored on a remote server device and may run partly or exclusively on the remote server device. These applications or VR content data may be termed cloud-hosted applications or data. The VR media player 10 may be in communication with the remote server device in order to utilize the software application or data stored there.

The above example embodiments therefore provided an intuitive and useful way of indicating to a user which virtual content items are suitable for display within a given real-world space of limited dimensions. A practical effect of this is not only to provide a more useful immersive experience, but also to avoid risks to users associated with walking into objects and walls. The example embodiments may be considered an enabler for obtaining recommendations for exploring volumetric VR content that optimally fits within a physical real-world space, improving the user experience in VR exploration, which may be in for example VR games and in free-viewpoint VR exploration of real and virtual locations.

It will be appreciated that the above described example embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
providing data indicative of dimensions of a real-world space within which a virtual world is to be consumed;
identifying one or more objects within said real-world space, wherein the one or more objects comprise real-world object(s);
determining one or more available areas within the real-world space for rendering three-dimensional virtual content, based at least partly on the indicated dimensions of the real-world space;
identifying one or more of the one or more objects as being movable with an action of a virtual reality user within said real-world space, wherein identifying the one or more movable objects comprises assigning a mobility score to each of the one or more objects indicative of whether or not it is movable with the action of the virtual reality user, where an object is identified as movable with the action of the virtual reality user where the respective mobility score is above a predetermined threshold;

identifying, from a set of three-dimensional virtual content items, one or more candidate items unable to be rendered within the one or more available areas unless at least one of the one or more moveable objects is moved; and providing an indication of the one or more candidate virtual items and of the one or more movable objects required to be moved with the action of the virtual reality user to be able to render the one or more candidate virtual items.

2. The method of claim 1, wherein the respective mobility score is based on characteristics of one of the one or more objects and/or a position of the one of the one or more objects within the real-world space.

3. The method of claim 2, wherein the respective mobility score is based on identifying a change in the position of the one of the one or more objects over time.

4. The method of claim 1, wherein the respective mobility score is based on one or more of:
- the size and/or weight of one of the one or more objects;
- identifying and classifying the one of the one or more objects against a set of real-world objects having pre-assigned mobility scores; or
- determining whether the one of the one or more objects has previously been identified as movable with the action of the virtual reality user.

5. The method of claim 1, wherein determining the respective mobility score comprises determining for each of the one or more objects a plurality of probability coefficients for the object based on its respective characteristics and/or positions, where the respective mobility score is an average or aggregate of the probability coefficients of the object.

6. The method of claim 5, wherein the probability coefficients are based on two or more of:
- the object's type,
- the object's size,
- the object's movement over time, and/or
- whether the object has previously been identified as movable with the action of the virtual reality user.

7. The method of claim 1, further comprising receiving a search term from the virtual reality user, wherein the provided indication of the one or more candidate virtual items is based on the relevance of each of the one or more candidate virtual items to the received search term.

8. The method of claim 7, wherein a relevance score is assigned to each of the one or more candidate virtual items based on their relevance to the received search term, and wherein the provided indication of the one or more candidate virtual items comprises a ranked order of the one or more candidate virtual items based on the respective relevance score and the respective mobility score of each of the one or more candidate virtual items.

9. The method of claim 1, further comprising identifying one or more characteristics of the real-world space and wherein the identified one or more candidate virtual items are based on said one or more characteristics.

10. The method of claim 1, further comprising determining data indicative of three-dimensions of the real-world space, wherein the action is configured to modify at least one of the at least one available areas to enable rendering of at least one of the one or more candidate virtual items.

11. The method of claim 1, further comprising providing an indication of one or more three-dimensional virtual content items that are rendered within the one or more available areas without moving one or more of the one or more movable objects.

12. The method of claim 1, further comprising detecting movement of a movable real-world object and outputting a selected one of the one or more candidate virtual items.

13. A computer program embodied on a non-transitory computer-readable storage medium storing computer-readable code, which, when executed with at least one processor, causes the at least one processor to perform:
- provide data indicative of dimensions of a real-world space within which a virtual world is to be consumed;
- identify one or more objects within said real-world space, wherein the one or more objects comprise real-world object(s);
- determine one or more available areas within the real-world space for rendering three-dimensional virtual content, based at least partly on the indicated dimensions of the real-world space;
- identify one or more of the one or more objects as being movable with an action of a virtual reality user within said real-world space, wherein identification of the one or more movable objects comprises assignment of a mobility score to each of the one or more objects indicative of whether or not it is movable with the action of the virtual reality user, where an object is identified as movable with the action of the virtual reality user where the respective mobility score is above a predetermined threshold;
- identify, from a set of three-dimensional virtual content items, one or more candidate items unable to be rendered within the one or more available areas unless at least one of the one or more moveable objects is moved; and
- provide an indication of the one or more candidate virtual items and of the one or more movable objects required to be moved with the action of the virtual reality user to be able to render the one or more candidate virtual items.

14. An apparatus comprising:
- at least one processor, and
- at least one non-transitory memory including computer program code,
- wherein the at least one non-transitory memory and the computer program code are configured, with the at least one processor, to cause the apparatus at least to:
  - provide data indicative of dimensions of a real-world space within which a virtual world is to be consumed;
  - identify one or more objects within said real-world space, wherein the one or more objects comprise real-world object(s);
  - determine one or more available areas within the real-world space for rendering three-dimensional virtual content, based at least partly on the indicated dimensions of the real-world space;
  - identify one or more of the one or more objects as being movable with an action of a virtual reality user within said real-world space, wherein the identification of the one or more movable objects comprises assignment of a mobility score to each of the one or more objects indicative of whether or not it is movable with the action of the virtual reality user, where an object is identified as movable with the action of the virtual reality user where the respective mobility score is above a predetermined threshold;
  - identify, from a set of three-dimensional virtual content items, one or more candidate items unable to be rendered within the one or more available areas unless at least one of the one or more moveable objects is moved; and provide an indication of the one or more candidate virtual items and of the one or more movable objects required to be moved with the action of the virtual reality user to be able to render the one or more candidate virtual items.

15. The computer program of claim 13, wherein the respective mobility score is based on characteristics of one of the one or more objects and/or a position of the one of the one or more objects within the real-world space.

16. The computer program of claim 15, wherein the respective mobility score is based on identifying a change in the position of the one of the one or more objects over time.

17. The apparatus of claim 14, wherein the respective mobility score is based on characteristics of one of the one or more objects and/or a position of the one of the one or more objects within the real-world space.

* * * * *